United States Patent
Bouchier et al.

(10) Patent No.: US 6,725,317 B1
(45) Date of Patent: Apr. 20, 2004

(54) SYSTEM AND METHOD FOR MANAGING A COMPUTER SYSTEM HAVING A PLURALITY OF PARTITIONS

(75) Inventors: Paul H. Bouchier, Little Elm, TX (US); Ronald E. Gilbert, Jr., Plano, TX (US); Guy L. Kuntz, Chico, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,590

(22) Filed: Apr. 29, 2000

(51) Int. Cl.⁷ ................................................. G06F 1/00
(52) U.S. Cl. ....................... 710/312; 710/311; 710/301; 710/302; 714/10; 714/11; 714/23; 709/220
(58) Field of Search ................................. 710/305–317, 710/301–304, 62–64, 72, 8–19; 709/201–203, 208, 220; 714/2, 10, 13, 23, 9, 11

(56) References Cited

U.S. PATENT DOCUMENTS

| | | | | |
|---|---|---|---|---|
| 5,113,523 A | * | 5/1992 | Colley et al. | 710/306 |
| 5,175,824 A | * | 12/1992 | Soderbery et al. | 710/313 |
| 5,701,440 A | * | 12/1997 | Kim | 710/52 |
| 5,819,061 A | * | 10/1998 | Glassen et al. | 711/106 |
| 5,903,771 A | * | 5/1999 | Sgro et al. | 709/112 |
| 5,948,087 A | * | 9/1999 | Khan et al. | 710/302 |
| 6,047,391 A | * | 4/2000 | Younis et al. | 714/43 |
| 6,112,271 A | * | 8/2000 | Lanus et al. | 710/306 |
| 6,138,247 A | * | 10/2000 | McKay et al. | 714/10 |
| 6,216,185 B1 | * | 4/2001 | Chu | 710/301 |
| 6,226,734 B1 | * | 5/2001 | Kleinsorge et al. | 712/13 |
| 6,311,268 B1 | * | 10/2001 | Chu | 713/1 |
| 6,378,021 B1 | * | 4/2002 | Okazawa et al. | 710/132 |
| 6,453,344 B1 | * | 9/2002 | Ellsworth et al. | 709/220 |

* cited by examiner

Primary Examiner—Paul R. Myers
Assistant Examiner—Raymond N Phan

(57) ABSTRACT

The inventive multiple partition computer system allows the reconfiguration of the installed hardware, possibly while the various partitions continue normal operations. This aspect includes adding and removing process cell boards and I/O from partitions which may or may not continue to run. The invention also allows changes to the association between cells, I/O and partitions. The partitions may be able to stay running, or may have to be shut down from the resulting changes. In the invention, multiple copies of the OS are running independently of each other, each in a partition that has its own cell boards with processors and memory and connected I/O. This provides isolation between different applications. Consequently, a fatal error in one partition would not affect the other partitions. A network of microcontrollers connected to a service processor, via a communications link, provides the service processor with information on each of the different cells, as well as a pathway to receive requests for configuration changes, and a pathway to command changes in the different cells or I/O. The combination of the service processor and the micro-controllers support dynamic changes to the partition configuration.

24 Claims, 4 Drawing Sheets

SYSTEM AND METHOD FOR MANAGING A COMPUTER SYSTEM HAVING A PLURALITY OF PARTITIONS

RELATED APPLICATIONS

The present application which is related to co-pending application U.S. patent application Ser. No. 09/561,812, entitled "POWER MANAGEMENT ALGORITHMS FOR LARGE COMPLEX SYSTEMS WITH HOT-SWAPPABLE ENTITIES", which is hereby incorporated herein by reference.

TECHNICAL FIELD

This invention relates in general to multi-processor computer systems, and in specific to a service processor that supports on-line reconfiguration of the multi-processor computer.

BACKGROUND

Prior computer platforms have been symmetric multi processors (SMP) arrangements where multiple CPUs are running a single copy of the operating system (OS). The OS provides time sharing services to allow multiple applications to run. However, this arrangement permits the applications to interfere with each other. For example, if the system is running an accounting application, the accounting application can allocate all the memory in the system, as well as use all the processors that the OS can allocate. Then, when some other application needs processors or memory, for example a manufacturing application, it would not be able to allocate any memory or processors for its needs, and therefore would freeze. Thus, the manufacturing application would have been frozen or impacted by the accounting application. This arrangement also leaves the system vulnerable to failures. Any problem with one application could corrupt the resources for all applications.

A known solution to this problem is to separate the computer system into partitions or protected domains. These partitions are hardware separations that place resources into separate functional blocks. Resources in one block do not have direct access to resources in another block. This prevents one application from using the entire system resources, as well as contains faults and errors. An example of such a system is the Sun Microsystems UE10K.

This solution presents its own problem, namely reconfiguration. The partitions, once defined, are static in nature, and cannot be readily changed. Thus, typical changes such as component replacement or system upgrades cannot be easily accomplished. Moreover, resources cannot be readily moved from one partition to another to satisfy workload balancing.

SUMMARY OF THE INVENTION

These and other objects, features and technical advantages are achieved by a system and method, which satisfy two aspects of reconfiguring a multiple partition computer system:
1. Reconfiguring the installed hardware, possibly while the various partitions continue normal operations. This aspect includes adding and removing cells and I/O from partitions which may or may not continue to run.
2. Changing the association between cells, I/O and partitions. The partitions may be able to stay running, or may have to be shut down (as for example in the case where a partition has all its cells moved to a different partition).

Several terms are defined in this paragraph which are necessary to understand the concepts underlying the present invention. A complex is a grouping of one or more cabinets containing cell boards and I/O, each of which can be assigned to a partition. Partitions are groupings of cell boards, with each partition comprising at least one cell. Each partition would run its own copy of system firmware and the OS. Each cell board can comprise one or more system CPUs together with system memory. Each cell board can optionally have I/O connected to it. Each partition must have at least enough I/O attached to its cell board(s) to be able to boot the OS. I/O (Input/Output subsystem) comprises an I/O backplane into which I/O controllers (e.g. PCI cards) can be installed, and the I/O controllers themselves. Cell boards in each cabinet are plugged into a backplane which connects them to the fabric. The fabric is a set of ASICs which allow the cells in a partition to communicate with one another, potentially across cabinet boundaries.

Cell boards are connected to I/O controllers in such a way that software or firmware running on a partition can operate the I/O controllers to transfer data between system memory and external disks, networks, and other I/O devices. One particular type of I/O controller is special—the Core I/O controller—which provides the console interface for the partition. Every partition must have at least one Core I/O controller installed. A complex has at least one service processor.

Thus, with a multiple partition system, multiple copies of the OS are running independently of each other, each in a partition that has its own cell boards with processors and memory and connected I/O. This provides isolation between different applications. Consequently, a fatal error in one partition would not affect the other partitions. Partitioning also permits server consolidation by eliminating older servers and migrating their applications onto their own partitions.

A hierarchy of components comprising a configuration tool running under control of the OS, the OS itself, system firmware, and a service processor is used to manage the partitions. The user interacts with the configuration tool to instruct the system to reconfigure itself. The configuration tool interacts with the OS, which interacts with system firmware, which interacts with the service processor to effect the desired reconfiguration.

A network of micro-controllers connected to the service processor, via a communications link, provides the service processor with information on each of the different cells, as well as a pathway to receive requests for configuration changes, and a pathway to command changes in the different cells or I/O. The combination of the service processor and the micro-controllers support dynamic changes to the partition configuration. For example, cell boards can be removed from a partition while the partition is on-line, and additional cell boards can be added to expand the system. Also, resources can be moved between the partitions. For example, a cell board can be reassigned from one partition to another partition while the system is on-line. The service processor can control the power for the cell boards and I/O subsystems which comprise the partitions.

Another aspect of the inventive system is the complex profile. The complex profile is a data structure containing information about the system configuration, such as which cells are assigned to particular partitions. The complex profile is initially created by the service processor, is modified by the configuration tool under control of the user, and is then downloaded to the service processor. Duplicate copies of the complex profile are stored through out the system, e.g. in the different cells. Thus, if the service processor should fail, the system can still operate using the copies of the complex profile dispersed through the system.

Therefore it is a technical advantage of the present invention to allow online replacement of components, including core I/O, cell boards, I/O backplane, service processor board, and cabinets.

It is another technical advantage of the present invention to allow multiple redundant components, e.g. core I/O boards, in a partition, so that if one component fails the operating system can switch to an alternate.

It is a further technical advantage of the present invention to allow the system to power-up and boot even if the service processor is not installed or is not functional.

It is a further technical advantage of the present invention to allow partitions to power-up and boot even if all the cells in a partition are not installed or are not functional.

It is a still further technical advantage of the present invention to allow initial creation of the partitions according to a predetermined arrangement, thereby permitting the OS to run.

It is a still further technical advantage of the present invention to allow distribution of the partition definitions or complex profile to all cells, and ensuring that all cells have the same partition definition.

It is a still further technical advantage of the present invention to have an interface to applications which allow the user to reconfigure the system.

It is a still further technical advantage of the present invention to allow communication of configuration information between partitions, even though the partitions are not able to communicate directly.

It is a still further technical advantage of the present invention to allow configuration tools to run on any one of the partitions, thereby saving the costs associated with providing a separate system to do reconfiguration.

It is a still further technical advantage of the present invention to provide an interface between the configuration tool and the operating system, and between the operating system and system firmware, and between system firmware and the service processor, such that each of the subsystems can cooperatively participate in system reconfiguration, while remaining online and fully functional.

It is a still further technical advantage of the present invention to allow the user to update any piece of firmware in the system to bring all modules to a compatible level of firmware, thereby allowing reconfiguration operations to involve modules with incompatible firmware installed on them.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
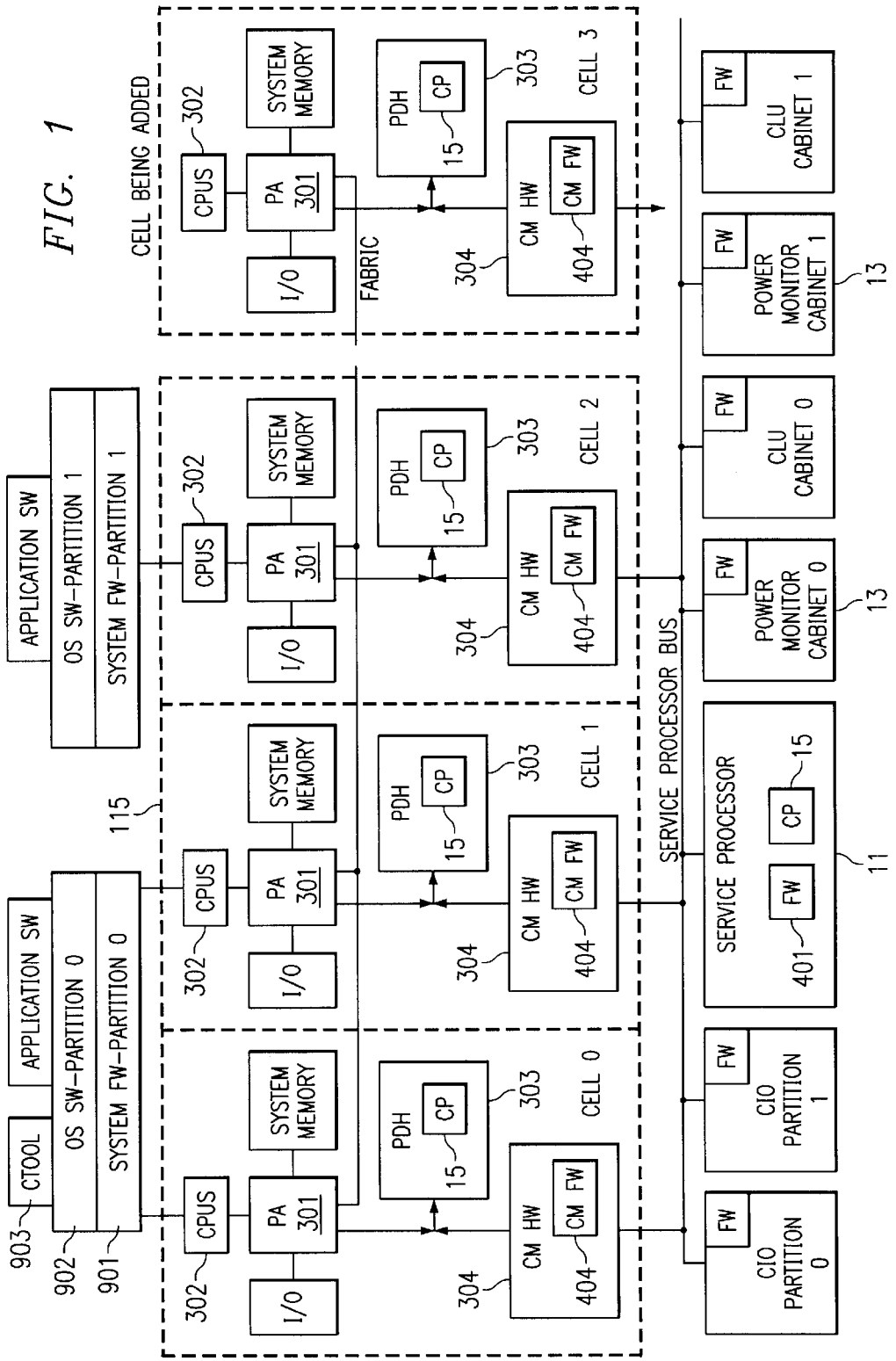
FIG. 1 depicts a block diagram of the hardware and software architecture of the inventive system.

FIG. 1 depicts the preferred embodiment for a logical block diagram of the hardware and software architecture of the complex. Each of the major modules is described in the following paragraphs. Many different configurations are possible, involving more or fewer cells configured into different partitions, and more or fewer cabinets. Note that the specific configuration shown in FIG. 1 is just for illustration. Note that only four cells are shown for simplicity but more or fewer cells could be present. Cell 3 is shown disconnected from the rest of the complex. It is unpowered and is not running any software or firmware.

The utility subsystem 10 comprises the service processor 101 and associated infrastructure, including power monitor 13, Cabinet Level Utilities (CLU), CIO, and Cell Microcontroller (CM) 304. The function of the utility subsystem is to manage the complex, including managing partitions when no system software is running. The service processor 101 is logically connected to the CM 304 on each of the different cells, e.g. cell 0, cell 1 and cell 2, and also to the power monitor module 13 for each cabinet, and also to the CLU module for each cabinet, and also to the Core I/O module for each partition. The preferred implementation uses the Universal Serial Bus (USB) for the logical connection between components of the utility subsystem. However any bus or method capable of conveying messages between the components could be used.

A cell is a circuit board containing one or more system processors, memory, an I/O connection module, a PDH module, and a CM module. The cell is the smallest unit that can be assigned to a partition. A partition is a cell or group of cells running a single copy of the operating system. A computer system using the inventive utility subsystem can comprise multiple partitions and can run multiple copies of the operating system simultaneously. It could also run multiple different operating systems simultaneously. Partitions form protected areas, wherein different partitions are restricted by hardware from directly accessing each other's memory areas.

The cells are shown connected by fabric. The fabric is a set of ASICs on the backplane of each cabinet in the complex, to which the cells are connected when installed. The fabric routes processor bus operations (e.g. read, write) between the originating cell and memory or I/O on the cell that contains the memory or I/O addressed by the bus operation.

Also shown in FIG. 1 is system firmware 901 running on the processors of cell 0 and cell 1, in partition 0. Cells 0 and 1 are connected by the fabric in such a way that processors on each cell can share the memory and I/O of both cells. Thus they can behave as if they are in a symmetric multiprocessor (SMP) comprising the CPUs and memory and I/O in cells 0 and 1. The techniques for making multiple CPUs function as an SMP are well known by those skilled in the art. An SMP is considered to run a single copy of the OS and system firmware.

System firmware 901 interfaces directly to the hardware of the cell and fabric, and to the CM using shared data structures located in memory in PDH 303.

Also running on the system processors of cells 0 and 1 is the operating system (OS) software 902. The OS interfaces with system firmware, which isolates the OS from the hardware. The OS causes application software to run on the processors, such as the configuration tool CTOOL 903, and other application software.

FIG. 1 also shows partition 1 comprised of cell 2. Partition 1 has system firmware and an OS and application software running on the processors of cell 2. Partition 1 and its running software are separate and isolated from partition 0—they share nothing, and are isolated from each other by hardware features in the processor agent (PA) 301.

Figure 2:
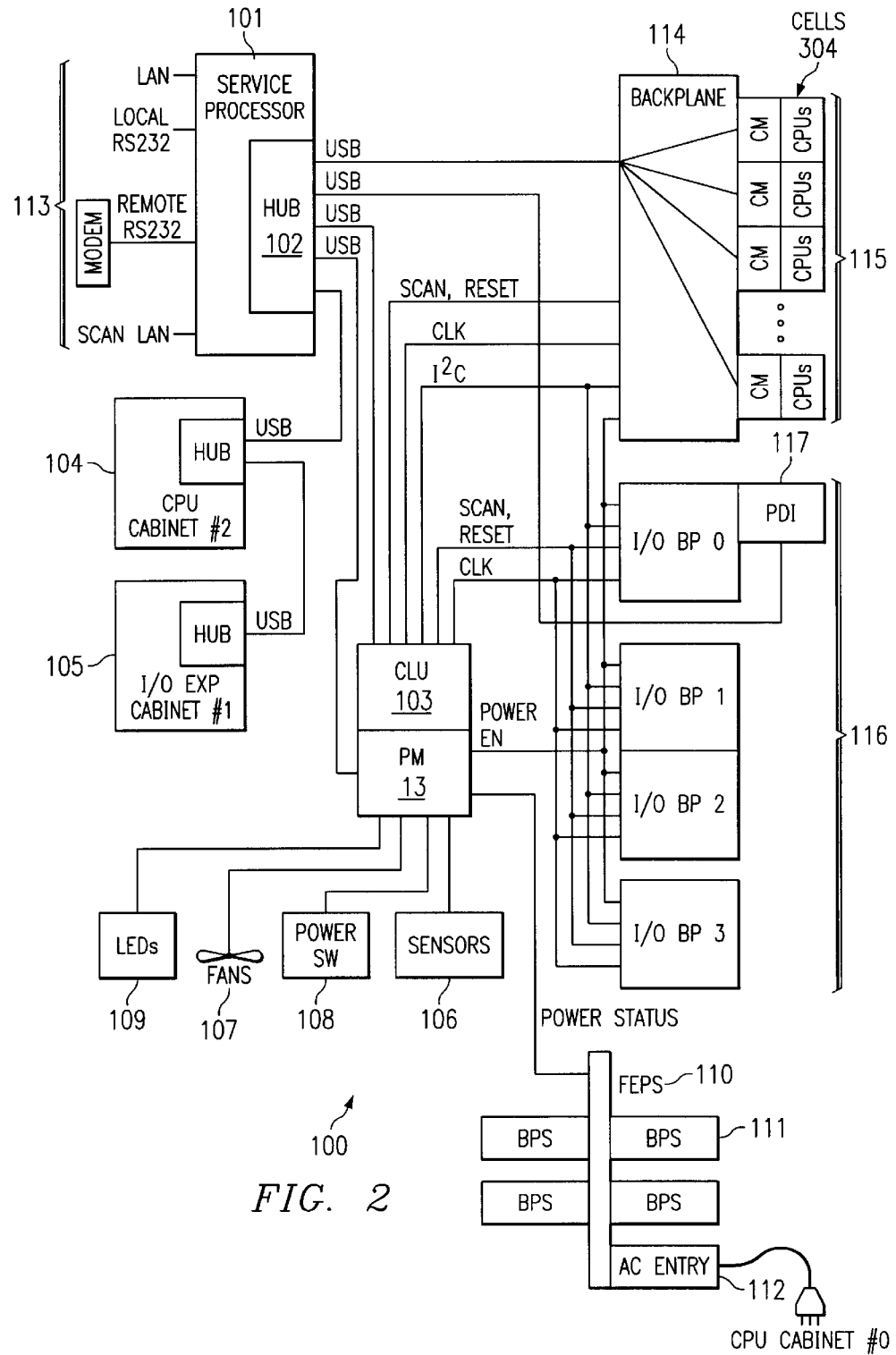
FIG. 2 depicts the preferred embodiment for an arrangement of the hardware architecture for the inventive system.

FIG. 2 depicts the preferred embodiment for an arrangement of the hardware architecture for the inventive utility subsystem and the complex 100. One cabinet of complex 100 contains a single service processor 101. Additional cabinets 104, 105 can be connected together to the cabinet containing the service processor to form a larger system. The inventive architecture is flexible with regard to controlling multiple cabinets. As shown in FIG. 2, USB can be cabled from the cabinet containing the service processor to other cabinets. Thus, a single service processor can control multiple cabinets. Note that three cabinets are shown as an example; fewer or more cabinets can comprise the larger system. Further note that the cabinets can be I/O expansion cabinet 105, which would only have I/O backplanes and no cells or cell backplanes. The service processor 101 controls the operations of the utilities subsystem.

Cabinet power is delivered by the front end power system (FEPS) 110. The FEPS comprises a plurality of bulk power supplies (BPS) 111. The BPSs can be replaced or added while the cabinet is on-line, i.e. hot-swappable. The BPSs provide DC power to all the subsystem elements, e.g. 48 volts from the AC source 112. The subsystem elements have DC-DC converters to step the input voltage, e.g. 48 volts, down to whatever voltage they require.

The I/O backplanes 116, shown here as four separate backplanes, each comprise a plurality of PCI bays or slots. Other I/O formats could be used, for example ISA or SCSI. The I/O backplanes provide connections between the cells 115 and system I/O devices that are connected to the I/O backplanes. One of the slots comprises the Core I/O (CIO) module 117. This module conveys console data between the service processor and the OS or system firmware running on the partition. The CIO module 117 includes an ASIC which provides a PCI interface to the operating system (OS) for the console. The CIO communicates with the service processor via USB. More information on the console and its relationship to reconfiguration support is provided in a later section.

The cabinet also includes backplane 114 into which the various cells 115 are plugged. The service processor 101 communicates with the cells 115, through the backplane 114 via USB. The cell board comprises a plurality of system microprocessors and associated memory devices. Each cell board includes a cell micro-controller (CM) 304. The CM operates to report status of the cell board, provide the FW update feature for updating FW on the cell, and provide communication between cell board and the service processor, via USB.

Figure 4:
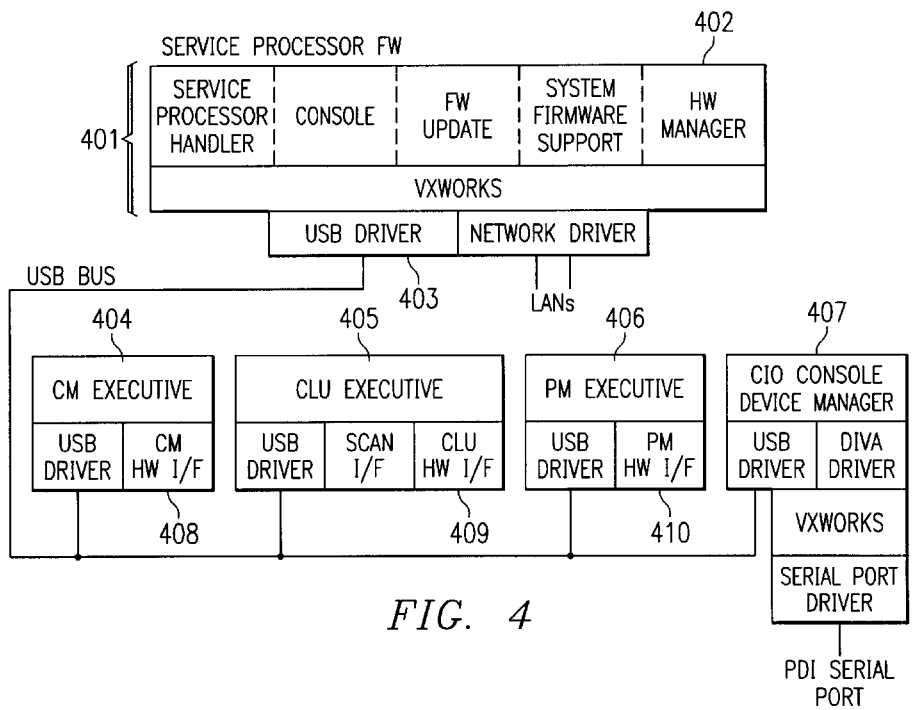
FIG. 4 depicts an arrangement of the utilities subsystem firmware architecture.

Referring still to FIG. 2, the architecture and function of components of the utility subsystem architecture will be explained. FIG. 4 provides additional detail and depicts the preferred embodiment for arranging the utility subsystem firmware architecture.

The service processor module 101 includes a USB hub 102 that is used for communications with other elements of the subsystem. The USB hub is universal serial bus (USB) format bus. The USB hub also allows the cabinet to communicate with other cabinets, e.g. 104, 105.

The service processor provides many general supportability and manageability features such as a user interface to control and monitor the complex. Of particular relevance to the inventive system are the following functions performed by the service processor:

Manage the complex profile. Provide an interface to system firmware which allows system firmware to retrieve and modify the complex profile. Other complex profile related features will be described in their own section.

Provide an interface to system firmware which allows system firmware to control the power to cells and I/O backplanes for reconfiguration purposes.

Provide an interface to system firmware which allows system firmware to obtain the complex configuration.

The service processor FW 401 is the firmware on the service processor which includes a hardware manager module 402, which is responsible for managing the complex (e.g. complex profile management, power enabling of the cells) and for reporting the configuration of the complex on demand. The system firmware support module provides a command interface to system firmware, allowing system firmware to control power, change the complex profile, retrieve complex configuration, and other tasks related to configuration that are described later. The service processor handler module provides a user interface that allows the user to manually control power, connect to the console for a partition, etc. The console module allows the user who is connected to the service processor to communicate with the console of each partition. The firmware update module allows the user to request the service processor to update system firmware on any cell, or utility firmware on any of the utility micro-controllers, or service processor firmware. The service processor FW is connected to the other utility subsystem FW via a USB line and USB driver 403.

The service processor may be an off-the-shelf processor that is configured via firmware and/or software to operate as the service processor. For example, the service processor could comprise an Intel Pentium processor or a HP PA-8500 RISC processor.

The complex 100 includes a power monitor (PM) module 13 in each cabinet that monitors and controls the power supply, e.g. 48V DC, cabinet environment, e.g. ambient temperature, and power distribution to the subsystem elements, e.g. cells and I/O backplanes. Monitoring is accomplished via sensors 106. Environmental control is accomplished via fans 107 or other cooling/heating devices. The PM also has the main power switch 108 for the cabinet. LEDs 109 indicate cabinet status. Note that the PM and the CLU may be mounted on a single board. The PM firmware 406 reports status of the cabinet level power and environmental conditions, as well as the status of other related elements, e.g. FEPS and fans to the service processor 101 via USB. Note that the power monitor does not have to rely on the service processor in order to start up and begin operations.

The cell micro-controller (CM) will be described in the cell architecture section below.

The cabinet level utilities module (CLU) provides cabinet level clock fanout to the other elements of the sub-system. The CLU 103 provides sub-system reset control and scan support, for example driving the JTAG scan engine. The CLU 103 also reports status of the main backplane and I/O backplanes to the service processor 101, via USB.

The service processor is also connected to the core I/O (CIO) module 117. This module is a circuit board installed in a PCI slot of I/O backplane 116. Every partition must have at least one CIO. Its function is to provide the console interface for a partition. The console interface is a special device used by both the OS and system firmware to interact with the user during system boot. The user would be located at a terminal which is logically connected via the service processor to the console interface on the CIO module. Since every partition must be able to boot, they must each have a console interface, hence the need for a CIO module for each partition. The CIO runs under control of CIO firmware 407, which passes the console data between a PCI interface ASIC and the service processor. Note that the OS and FW will only recognize one console. Thus, if multiple CIO modules are installed in a partition, system firmware on the partition picks one to use as the active console. Note also that if there are more than one partition, there will be more than one CIO module connected to the USB bus.

The preferred implementation has the cabinet level utilities module (CLU), the power monitor and the service processor and Core I/O implemented as separate microprocessors all connected by the service processor bus. However, other partitioning of the utilities subsystem is possible. For example, the power monitor, CLU, CIO, and service processor could all be on one HW module, or they could be FW modules all running on the service processor. There could even be multiple service processors which might share the job of complex reconfiguration. The partitioning of the utilities subsystem is not important to the inventive system. However, the ability for a service processor to control power and to manage the complex profile is an important aspect of the inventive system.

Figure 3:
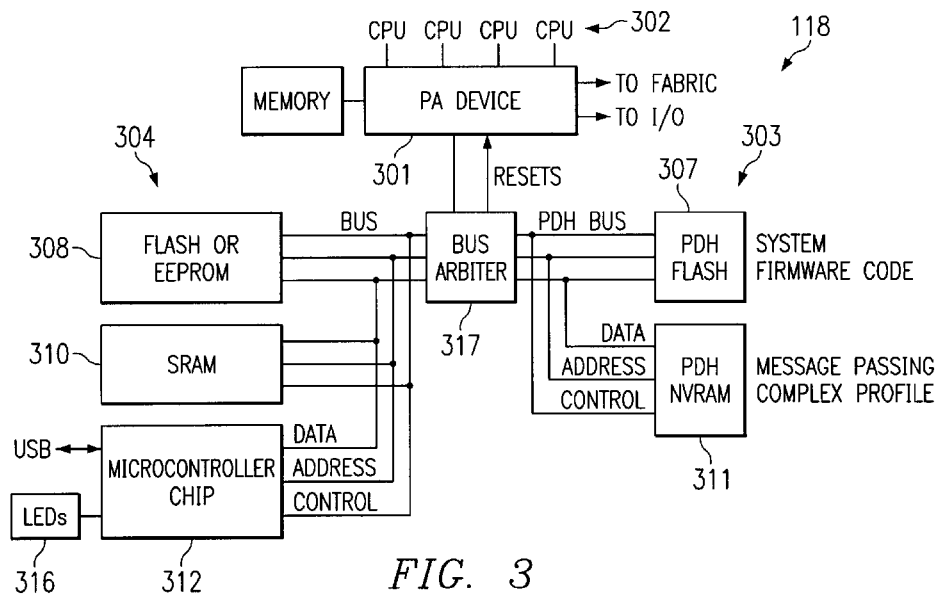
FIG. 3 depicts a block diagram of the cell of the inventive system.

FIG. 3 is a block diagram of the preferred embodiment of the cell architecture. There are six major subsystems on the cell:

1. The system processors 302, which execute system firmware, OS, and application code.

2. System memory, which is connected to PA 301 and which is used by the OS, application software, I/O, and some of the time by system firmware.

3. Processor Dependent Hardware (PDH) 303, which contains the PDH flash memory device 307 that holds the system firmware. PDH 303 also contains the PDH NVRAM 311, one segment of which is used by system firmware for working storage, and another segment of which is shared between system firmware and the cell micro-controller 304 (CM).

4. The Processor Agent 301 (PA), which is an ASIC that connects the system processors 302 to system memory, the fabric, I/O, and PDH.

5. The cell micro-controller 304 (CM), which is a micro-controller chip 312 with its boot flash ROM 308 and SRAM 310 and a USB connection to the service processor 101. The CM can access PDH NVRAM 311 via the bus arbiter 317.

6. The bus arbiter 317 which arbitrates requests from the PA 301 and the CM 304 to read or write into PDH memory space.

Each of these subsystems and the way they relate to reconfiguration is described in greater detail in the following paragraphs.

The processor agent (PA) device 301 is an ASIC that connects the system processors 302 to devices in PDH 303, via the bus arbiter 317. The system processors send memory requests through the PA device, which requests the bus arbiter 317 to grant access to PDH 303, and to perform the requested reads and writes.

The CM includes Flash/EEPROM memory 308 and SRAM memory 310. The memory 308 is used to hold FW 404 for the cell micro-controller chip 312. SRAM memory 310 provides RAM for use by FW 404. The cell micro-controller handles communications with the service processor for the CM. The CM also includes some LEDs 316 for indicating status of the cell.

The CM 304 monitors power and environmental conditions on the cell by means of registers that indicate cell status.

The CM also interfaces the system firmware 901 running on the system processors 302 of the cell to the service processor firmware 401. It does so by means of shared data structures located in PDH NVRAM 311.

The CM also updates system firmware code by reprogramming PDH flash 307 upon request from the service processor. This system firmware update feature can be important to reconfiguration, because the system firmware for all cells in a partition must be compatible in order for the cells to successfully form a partition. Incompatible firmware revisions on different cells could happen for example if a cell that is to be added to a partition was manufactured at a different time with a different revision of system firmware. If the system firmware on different cells in a partition is not compatible, the CM must update the system firmware on one or more cells, so that all cells contain compatible system firmware.

Referring now to FIG. 4, the CM firmware 404 is the FW for the CM of one cell of the cabinet. Thus multiple cells would have multiple CM FW modules connected via USB to the service processor. The CM hardware interface 408 is the firmware module that manages the shared memory areas containing the complex profile and the command queues (described later).

The CM also updates its own firmware code 404 by reprogramming CM flash 308 upon request from the service processor. This CM firmware update feature can be important to reconfiguration, because the utility subsystem firmware must be compatible in order for reconfiguration to operate correctly. Incompatible firmware revisions on different cell's CM modules could happen, for example, if a cell that is to be added to a partition was manufactured at a different time with a different revision of CM firmware. CM firmware is designed so that firmware update is always possible, even among different revisions of CM firmware and service processor firmware.

Figure 6:
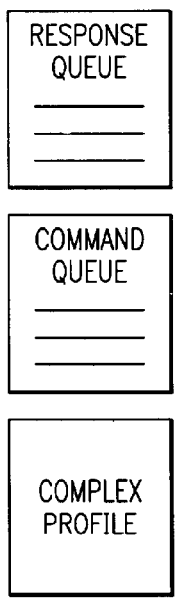
FIG. 6 depicts the data structures shared between system firmware and utility firmware.

Bus arbiter 317 is used to arbitrate CM PDH bus usage and PA PDH bus usage. Thus, the cell micro-controller 312 and the PA 301 can make interleaved accesses to PDH devices. System processor transactions can be directed down through the arbiter chip into PDH NVRAM memory 311. Moreover, the cell micro-controller 312 can also send read and write transactions through the arbiter chip to PDH NVRAM memory 311. Consequently, the CPUs 301 and the cell micro-controller maintain a set of shared data structures that are located in the NVRAM. The shared data structures are used for communicating different pieces of data, and include commands that the main CPUs 301 can have the service processor execute. Other data structures include the complex profile which defines which cells are in which partitions. FIG. 6 shows some of these shared data structures.

The PDH module includes PDH flash memory 307 and non-volatile RAM memory 309. The flash memory 307 holds the system firmware boot code, which is the system firmware layer which boots the machine and abstracts the platform from the OS. System firmware can initiate memory-mapped accesses to devices in PDH. The NVRAM memory 311 holds the complex profile, and is used in message passing between the processors 302, and the cell micro-controller 312. The RAM memory may comprise battery-backed up RAM memory.

Note that although the preferred embodiment uses one CM and one PDH module per cell, it would be possible to implement a CM and PDH that is shared between cells.

The complex profile is the collection of data structures that specify the current configuration of the entire system complex. It contains the definition of which cells are in which partitions, and the characteristics of those partitions, e.g. name, boot path, memory interleave, etc. These data structures contain all complex configuration parameters, fabric routing information, system identification information (model number, model string, complex serial number, etc.), one or more partition profiles, and an OS specific region. There is only one complex profile definition per complex and the definition is shared by all partitions. Each cell and the service processor have a copy of the current complex profile (CP) 15. In addition, the service processor may have a copy of a new complex profile that has not yet been distributed to cells.

The preferred implementation has three classes of data in the complex profile, though other implementations may have more or fewer. They are:
1. Global configuration data, such as the assignment of cells to partitions, complex name, fabric routing information, etc.
2. OS configuration data, for allowing the different OS's running on different partitions to communicate configuration data.
3. Partition private data (one data structure for each possible partition). Contains data such as boot path, partition name, memory interleave, etc. It is referred to as the "partition profile". The existence of this data structure allows the CTOOL to create a partition prior to installing hardware for the partition, and to set the boot parameters and configuration of the partition. When hardware for the partition is installed, it will be ready to boot into the desired configuration.

The inventive system includes the complex profile, and the techniques for using it, creating it, updating it, and managing it. Accordingly, this section describes those aspects of system operation that relate to the complex profile.

System firmware relies on the contents of the complex profile to know which partition it should boot into. The copy of the complex profile stored in a cell's NVRAM 311 cannot be assumed to be correct, because the cell may have just been added to the complex, and what is in its NVRAM may be the complex profile from a different system. Alternatively, the service processor may need to change the complex profile in cell's NVRAM in order to effect a change in configuration. The boot process described below handles these situations. Several pieces of information must be exchanged between system firmware and the CM during cell boot. This information is also defined below.

In the preferred embodiment, the bus arbiter 317 includes several registers used during reconfiguration and configuration boot operations to communicate between system firmware and the CM. The bits relevant to reconfiguration and booting a configuration are described here:

Shared Memory Good (SM_GOOD). This bit is used to communicate from system firmware to the CM that shared data structures and the pointers to them are valid. It is cleared when the cell is powered on, or is reset by the CM. When system firmware 901 starts booting, it checks the validity of the data structures shared between it and the CM. If they are corrupt, it recreates them. Then it sets the SM_GOOD bit. The CM polls the SM_GOOD bit, and when it is set, the CM checks the complex profile as described below.

Boot Is Blocked (BIB). This bit is used to communicate from the CM to system firmware that the complex profile is correct and that the cell should boot. It is set when the cell is powered on, or when the cell is reset by the CM. System firmware can also set it when it knows that a reconfiguration is pending. In this case, system firmware reboots itself and waits to be notified that reconfiguration is complete and a new complex profile is available. The CM clears BIB on command from the service processor after the service processor has validated the copy of the complex profile in PDH NVRAM as described below.

Online Addition (OLA) Steering bit. This bit is used to communicate from the CM to system firmware that system firmware should boot and join an already running partition as opposed to booting and joining up with other cells that are also booting.

As previously noted, system firmware boots and sets SM_GOOD after validating the data structures that it shares with the CM. System firmware then continues with cell initialization in parallel with CM operations which validate the complex profile using algorithms described later. Note that at this point, all cells are running their own copy of system firmware using resources (ROM, NVRAM, system memory) local to the cell. They have not rendezvoused, or joined the other cells of a multi-cell partition. In fact, they cannot assume that the complex profile is valid because the BIB bit is set. (BIB clear is the signal from the CM to system firmware that the complex profile is valid.) Therefore they cannot interact with other cells prior to detecting BIB clear, because they do not know which other cells are in their partition. Clearing the BIB bit performs a double function—it both releases the cells to boot into a partition, and informs them that the complex profile is valid.

After the CM and service processor have validated (and potentially updated) the complex profile, the CM receives a command from the service processor to clear the BIB bit. Each cell in the partition then reads the complex profile, and discovers (among other things) which other cells are in its partition. Each cell in the partition then stores the list of cells that are in its partition into the partition cell-set register in the PA ASIC which controls access to that cell's resources (memory, I/O, etc). The partition cell-set register causes the PA ASIC to reject any transactions (read or write requests) arriving from the fabric port that do not come from one of the cells in the partition of which the cell is a member. In this way, hardware isolation from errant software in other partitions is provided in a flexible and reconfigurable way. If other partitions were to attempt to read or write resources owned by a cell, the attempt would be rejected by the PA ASIC.

After setting the partition cell-set register, system firmware on each cell goes on to rendezvous with the other cells in the partition. Prior to rendezvous, each cell is executing system firmware instructions independently of all other cells. After rendezvous, one processor in the partition is actively running system firmware, and all others are quiescent in an idle loop, waiting to be told to do something. The single active processor continues booting the partition, loads the OS and starts it, and the OS takes control of all the system processors and can start scheduling them to do work. The concepts of a multi-processor rendezvous during boot, an idle loop, and scheduling multiple processors are well known to those skilled in the art of symmetric multiprocessors.

Note that a complex profile defines the configuration of a complex, and in the preferred embodiment the complex can not be configured by an outside entity, but rather must be configured by a complex configuration tool (CTOOL). The tool runs under the OS, while the OS requires a configured partition to run. To handle the initial creation of the complex profile, the service processor allows the user to run a command which generates the initial complex profile, wherein the initial complex profile configures the complex into a single partition consisting of a single cell. This initial partition can be booted to allow access to the CTOOL and to enable flexible reconfiguration of the complex.

Note that since virtually every component in the system can be online-replaced, there is no single place where a master copy of the complex profile can be stored and accessed by every cell. Therefore, the complex profile is replicated in the service processor and in each cell. All the copies of the complex profile must be identical, therefore the service processor must ensure system wide complex profile consistency by performing a consistency check after the system powers on. The goal of the consistency check is to ensure that all cells and the service processor have coherent copies of the same complex profile. The preferred implementation of the consistency check is to calculate the checksum of each distributed copy of the complex profile and to compare these checksums to each other. If there is a checksum mismatch then the service processor applies some rules to determine which complex profile should be selected. In the event that the service processor is unable to ascertain what the complex profile should be, user intervention is required.

For each cell that asserts SM_GOOD, the service processor will request the cell (CM) to calculate a complex profile checksum and compare it to the checksum stored in the complex profile. If the two checksums match then the cell (CM) will report back to the service processor its checksum and that its checksum is valid. Otherwise, the cell (CM) will report back to the service processor that its checksum is invalid. The following rules are used to determine the correct complex profile:
1. If no cells or the service processor have a valid complex profile then user intervention is required
2. If the service processor has a valid complex profile but none of the cells do, then the service processor will distribute its copy of the complex profile to the cells.
3. If all the cells have the same valid complex profile and it is different from the service processor's complex profile, then the service processor will automatically retrieve a copy of the complex profile from one of the cells. This covers the case where the service processor has been hot swapped.
4. If the cells have different valid complex profiles, then user intervention is required.

The service processor can use any convenient means to signal the need for user intervention, e.g. flash a light, print a message on a connected terminal, sound an alarm, etc.

The choices available to the user when user intervention is required are:
1. Have the service processor create an initial complex configuration
2. Set the complex profile to one of the service processors default complex configurations (only valid if the service processor provides additional canned complex profiles beyond the one necessary to do an initial out of the box complex configuration)
3. Set the complex profile to one of the saved user defined complex profiles stored in the service processor (only valid if the service processor saves user defined complex profiles).

Once complex-wide complex profile consistency is established then the service processor must ensure that it is maintained. This is accomplished by distributing a copy of the complex profile to all new cells that are added to the complex and by distributing any complex profile modifications to all cells in the complex. Note that if USB is not functioning to all powered on cells in the complex, then the service processor will not allow the complex profile to be modified.

The service processor stores a copy of the complex profile in its non-volatile RAM, and only the service processor can directly modify the complex profile and all its copies. However, the service processor provides an interface (system firmware interface) which allows other entities (system firmware, CTOOL, etc.) to indirectly modify portions of the complex profile. Some portions of the profile can only be modified by the service processor, e.g. system identification information.

Since multiple partitions share the complex profile and can issue commands that affect the complex profile at the same time, software locks and keys must be used on the complex profile to only allow one partition OS at a time to change the profile. This prevents modifications from different partitions from interleaving and causing corruption of the complex profile. Thus, all modification commands must be accompanied by the lock's key (Note the complex profile is really a group of data structures and thus each individual data structure is protected by its own lock and key). The service processor allows only one key (per data structure) to be outstanding at a time. When the key is returned, the service processor re-keys the complex profile lock, which invalidates any outstanding keys. Once the lock re-keying is complete the key is once again available to any entity wishing to modify the complex profile. The service processor errors out all modification commands that are not accompanied by the valid key.

Many of the aspects of the interaction between the CM, system firmware, and the complex profile could be implemented in ways different from the preferred embodiment described above without departing from the central idea. For example, the complex profile could contain different information, or could be obtained on demand from the service processor by system firmware, or could be pre-installed prior to release of reset. System memory and/or PDH resources and/or I/O could be centralized, with the equivalent of a partition cell-set register protecting access to those resources on the basis of a physical computing element. Whatever the implementation, the following ideas are central to a multiple partition computer that can be flexibly configured into different partitions where the partitions have hardware-enforced isolation or protection from one another:

There is a definition of which ones of a plurality of hardware computing elements (e.g. processors) are assigned to which ones of a plurality of hardware resources (e.g. memory and/or I/O). There can be a one to many, a many to one, or a many to many relationship between computing elements and resources. One or more {computing element(s)}–{resource(s)} assignments can co-exist. Each group of computing elements and their assigned resources is called a partition in this document, though other names could be used.

The definition of partitions is created with some goal in mind, and is installed into the system using a piece of software. This software may be the CTOOL running on a partition, as in the preferred embodiment, or may be a program running on an external system (e.g. a monitoring workstation). The definition may be automatically generated, as for example by load balancing software, or may be generated with human intervention, as for example when a user reconfigures the system.

Each partition is a physical grouping of computing elements and resources that can be independently reset, powered down, booted etc. without affecting any other partition (except where partitions have agreed to cooperate).

Each partition runs a unique instance of the operating system. (The operating system is the lowest level software that assigns computing elements to tasks which use resources.) Some examples of systems which are not multiple partition computers are:

Uniprocessor or symmetric multiprocessor computers running a timesharing operating system (e.g. Unix, MVS)

A system based on IBM's Logical Partitions (LPARs).

A multiple partition computer does not have a kernel or microkernel or other scheduling software that runs on the computing elements themselves and directly assigns computing elements to processes or tasks resident in partition memory, although individual partitions would normally have such.

A partition executes a stream of instructions independently from another partition, and has resources such as memory and/or I/O assigned to it which are private from other partitions.

Any computing element and any resource assigned to a partition can only be in a maximum of one partition at any time. (It may be in no partition.)

The definition of partitions can be flexibly configured, and potentially could be changed. Changes may or may not require a reboot of the partition.

There is a hardware element in the system which checks access requests from a computing element running a program to a resource such as memory or I/O. The access checking element must understand the access rules. These rules are based on the partition definition and they enforce the hardware protection of a partition.

The definition of the association between computing elements and resources must be given to the checking element. It could be given by system firmware (as in the preferred embodiment where system firmware programs the partition cell-set register) or it could be installed by the service processor, or given in some other way.

If the definition of the association between computing elements and resources is changed while a partition is running, there must be a means to coordinate the change in the definition with the partition's use of the definition and with the checking element. This is necessary so that a partition does not attempt to use a definition that is in the process of being changed, and also so that the checking element doesn't check accesses that are inconsistent with the partition's view of the definition. Such coordination may involve locks around the use of the definition, or notification to partitions that the definition has changed, or other means.

Each computing element must start executing instructions when it is released from reset and must rendezvous with the other computing elements in its partition, so that the partition becomes a symmetric multiprocessor. The determination of which particular computing elements rendezvous must be based on the current definition of the partitions. This could be done by system firmware (as in the preferred embodiment), or by the service processor telling each computing element which other computing elements to rendezvous with, or in some other way.

Also note that the definitions above do not preclude partitions from cooperating with each other in ways that do not violate the hardware-enforced protection (such as sharing memory that is external to the protected region of the partition).

The NVRAM 311 also contains a buffer which can hold commands that system firmware 901 (running on main processors 302) can issue to the service processor. System firmware would be caused to issue these commands by the actions of a user interacting with the CTOOL. The user would be using the CTOOL to perform some operation such as partition reconfiguration. The CTOOL would make requests to the OS, which would make requests to system firmware, which would issue the commands described here. There is an associated response buffer, by which means the service processor indicates to system firmware the response to commands. These buffers are shown in FIG. 6.

The CM 304 then conveys the commands to the service processor, via the firmware architecture shown in FIG. 4 and the hardware architecture shown in FIG. 2. Thus, the commands are central to having the service processor as a cooperative part of system reconfiguration. These commands allow the system processors to reconfigure the system via the service processor.

For example, the command "Reconfigure complex" would have a new complex profile associated with the command that would get sent to the service processor. The service processor would then distribute the new complex profile to all of the cells in the complex. Other commands allow for the on-line interchange or addition of components (hot swapped), such as cells, I/O backplanes, cabinets, etc. After being swapping or newly added, the component must have the same complex profile as the other components. This operation is described in greater detail later.

Similarly, the CTOOL can issue commands to have a particular component powered up/down. Therefore, this architecture allows for the on-line replacement of cell boards, I/O bays, and cabinets. Thus, the system can be enlarged without having to shut the system down. Moreover, since the complex profile is distributed on different components, the system to power up without a functioning service processor.

Note that a newly added cell would not be running the OS, but rather its system firmware, and the service processor would issue commands to have the new cell attempt to merge with the OS running on its partition.

Note that some components of FIG. 2 can be hot-swapped and do not have complex profiles, e.g. power supplies and fans, and thus do not need to be updated.

Also, replication of the complex profile allows some subset of the cells and I/O backplanes assigned to a partition can power up and boot, even though the full complement of hardware is not available. This feature allows configuring the system to provide higher availability through redundancy.

The commands relevant to reconfiguration are shown and described below, together with the parameters passed in with the command, and data returned by the command.

1. FUNCTION: Retrieve complex profile. This command allows the CTOOL to display the current complex configuration to the user, who may be planning changes.
PARAMETERS: None
RETURNS: Copy of the complex profile.

2. FUNCTION: Reconfigure Complex. Cause a new complex profile to be distributed to all cells. The requestor must hold a lock for the section of the complex profile that is to be modified.
PARAMETERS:
   The new section of the complex profile that defines the global characteristics of the complex, including the assignment of cells to partitions.
   The list of partitions that must be rebooted before the updated complex profile can be distributed to all cells.
   Lock key
RETURNS: Success or Failure 1. FUNCTION: Acquire lock key. Acquire attempts to acquire a lock on the complex profile or one of its sections for the requesting partition.
PARAMETERS: Section of complex profile to be locked
RETURNS: Lock key or failure 2. FUNCTION: Return lock key. Return lock key releases the lock without modifying the complex profile.
PARAMETERS
   Section of complex profile to be unlocked
   Key
RETURNS: Success or failure 1. FUNCTION: Break lock. Forces a lock to be released, even though the requestor does not currently hold the lock. This is a manual override in case the key gets lost.
PARAMETERS: Section of complex profile to be unlocked
RETURNS: Success or failure 2. FUNCTION: Power on/off cell or I/O backplane. Supports reconfiguration by allowing the user via the CTOOL to power cells or I/O backplanes on or off prior to or after removal or addition operations. The service processor could restrict the modules that can be designated by this command to cells or I/O backplanes that are assigned to the requesting partition, or are assigned to no partition. Thus it could enforce protection between partitions by refusing to power on or off cells and I/O backplanes that belong to another partition.
PARAMETERS: Cell or I/O backplane number
RETURNS: Success or Failure 3. FUNCTION: Turn on/off LED. Each removable item such as cells and I/O backplanes has an LED which draws attention to it as the particular unit that should be added or removed. This command allows the CTOOL to control the LED so as to identify to the user which piece of hardware they should install or remove.
PARAMETERS: LED identifier
RETURNS: None 4. FUNCTION: Report at BIB. The reporting cell informs the service processor that it is waiting for the BIB bit to be released. The service processor may be waiting for cells to report at BIB before it distributes a new complex profile, and if so, this command informs it that the reporting cell has arrived at BIB.
PARAMETERS: None
RETURNS: None 5. FUNCTION: Online Add Cell. This command is given by a running partition, and causes the designated cell (which must be sitting waiting for BIB to be released) to be released to boot into a partition that is already running. It's direct effect is to set the OLA Steering bit described under "Cell Architecture", and to clear the BIB bit
PARAMETERS: Cell number
RETURNS: Success or Failure when "Report Ready to OLA" command is given.

6. FUNCTION: Report ready to OLA. This command is issued by a cell that is released from BIB with the OLA steering bit set to cause it to rendezvous with a running partition. It causes completion status to be returned for a preceding "Online Add Cell" command to the running partition that issued the "Online Add Cell" command.
PARAMETERS: None
RETURNS: None 7. FUNCTION: Retrieve cell configuration. Returns information that system firmware on the designated cell has provided to the service processor about that cell, such as how much memory and how many processors are installed. This function is used to help the CTOOL display a picture of the current configuration of the complex hardware to the user. It allows a partition to obtain information about other partitions and their configuration.
PARAMETERS: Cell number
RETURNS: Cell configuration 8. FUNCTION: Retrieve cell or I/O backplane slot state
PARAMETERS: None
RETURNS: Returns information for each possible cell or I/O backplane indicating whether the cell or I/O backplane slot exists, whether it has a cell or I/O backplane installed, whether it is powered, and whether it is waiting to be configured. This information is used by the CTOOL to create a picture of the state of the complex for the user who is checking the configuration of the complex, and may wish to modify the configuration.

Note that the commands allow configuration information can be communicated between partitions even though partitions are not able to communicate directly. So one of the benefits of this partitioning is that there is isolation enforced by hardware between partitions, so that the software running on different partitions are isolated from malfunctions from each other. A partition has to voluntarily accept a new complex profile (by rebooting for reconfiguration). Thus it is immune to a malicious push of a new complex profile by a wayward partition. However, if a cell is down, or is unbootable, it will accept the new complex profile. Thus, partitions cannot reset one another. However, partitions can still acquire information about each other for a complex wide view. The service processor would provide the information to a user for system reconfiguration. For example, using the CTOOL, a user could reconfigure the system by moving cells from one partition to another, or by adding a partition and providing the new partition with resources from other partition(s).

The shared memory, NVRAM 311, allows information and commands to be conveyed back to the service processor. Thus, the service processor can ensure that all of the components that have complex profiles have coherent copies. Moreover, the service processor can then manage operations of the cells, e.g. turn cell power on or off.

Figure 5:
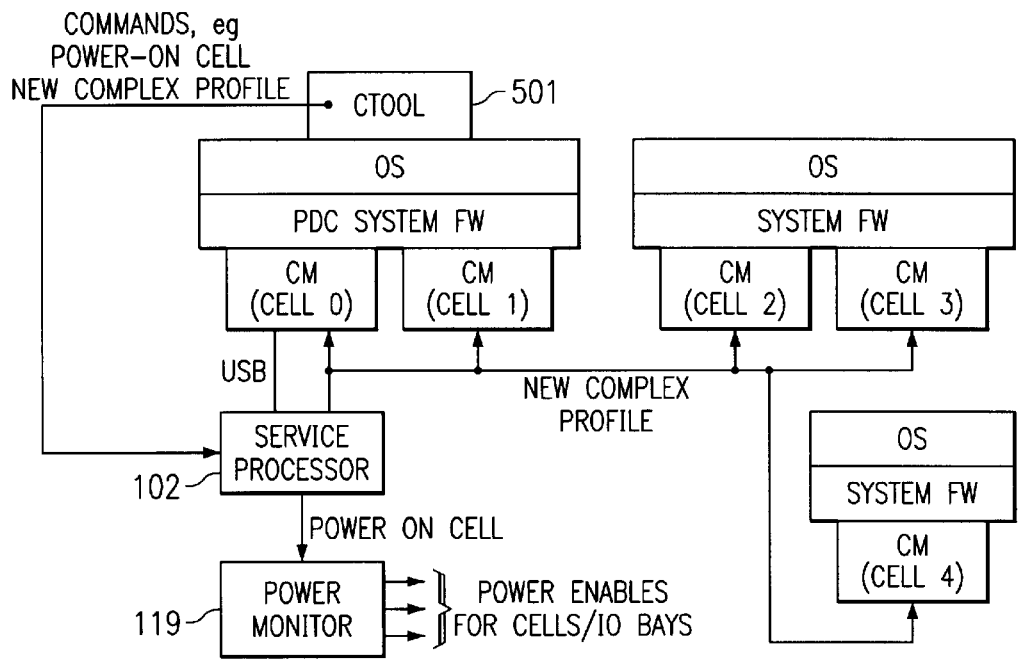
FIG. 5 depicts the flow of commands through the inventive system.

FIG. 5 depicts the flow of commands through the computer system, and the interaction of the service processor during reconfiguration, (e.g. powering up components), and distributing complex profiles according to the issued commands. The command may originate from a user's interaction with the CTOOL.

The user may be a person or monitoring program that monitors the overall use of the system and balances resources. In the preferred embodiment, the user would access the CTOOL in the OS of one of the partitions, which is the configuration interface to the user. The user can specify which partition or partitions are to be affected by the command. The CTOOL would be used to create a new complex profile that includes the desired change(s). The new complex profile would be communicated to the service processor via one of the CM 304 modules on a cell in the partition. The service processor then redistributes the new complex profile to all the profile-bearing components on the system.

Note that FIG. 5 depicts three partitions, however, the system may comprise more or fewer partitions. Also note that the numbers of cells per partition is by way of example only, as each partition could comprise one or more cells.

The command from the CTOOL is transported to the service processor 101, through the OS, the system firmware, and PDH NVRAM, and across USB. The service processor then manipulates the appropriate component(s) or returns the requested information (e.g. fan status). If a new complex profile is supplied (because, for example, a cell has been added or changed), then the new complex profile reflecting the change is sent to the appropriate components once the affected cells have reached a state appropriate to the change. This allows the various OS's that could be running or system firmware if there is no OS running, to boot, reboot, or accept/delete a component into their respective partitions.

Note that an on-line replacement is an on-line deletion followed by an on-line addition. Also note that the service processor is also hot swappable. The new service processor would not have a coherent copy of the complex profile. Thus, the new service processor would realize that its copy is not correct, and will load a copy from a cell or other profile-bearing component.

The following steps describe system operation during a reconfiguration operation. CTOOL is used as an example, but the operation is not limited to CTOOL. For example, an automatic load balancing utility could perform the reconfiguration operations.

1. Customer interacts with CTOOL to describe a set of changes to the complex. This includes identification of partitions to boot once the changes have been made.
2. CTOOL determines what cells are affected by the reconfiguration request.
3. CTOOL locks the affected parts of the Complex Profile.
4. CTOOL reads the affected parts of the Complex Profile and ensures that no changes have occurred in the complex that conflict with the changes that CTOOL has been told to make.
5. CTOOL determines if any of the affected cells are active and if possible online deletes those cells (this can keep entire partitions from having to be shutdown).
6. CTOOL makes the remaining changes by creating a new global portion of the complex profile (and possibly parts of the partitions' profiles).
7. CTOOL gets confirmation from the user to do the reconfiguration.
8. CTOOL writes any partition profiles that are changed.
9. The service processor unlocks each partition profile after it has been pushed out to the cells in the respective partitions. Note: if none of the cells in a partition are active (they are all ready for reconfiguration—waiting for BIB to be released) then the service processor just accepts the new partition profile and is done—the new partition profile will get pushed out when the partition boots.
10. CTOOL writes the global portion of the complex profile. CTOOL provides a list of affected cells and a list of partitions to boot (this list is not restricted to new partitions and partitions that had to be shutdown, though those partitions are the ones that normally would be included).
11. The service processor verifies that all cells whose partition assignment is changed are included in the affected cell list. If any discrepancies are found then the service processor rejects the complex profile write request.
12. From this point on the service processor will not boot any partition that has an affected cell (cell membership is based on the current complex profile).
13. CTOOL determines what partitions if any, need to be shutdown. A partition needs to be shutdown if any of its active cells are affected cells—this takes into account CTOOL's attempt to online delete active cells that are affected cells.
14. CTOOL interacts with the customer to either shut down the affected partitions or to have the customer shut down the partitions. In all cases, shutdown for reconfiguration must be used. Shutdown for reconfiguration is a method of shutting down the OS and causing it to return to system firmware. System firmware sets BIB and then issues the "report at BIB" command and then waits for BIB to be cleared by the CM.
15. CTOOL ensures that all affected cells are ready for reconfiguration. CTOOL will wait a period of time for all affected cells to become ready for reconfiguration, after which CTOOL will interact with the customer to either get all affected cells ready for reconfiguration or to abort the complex reconfiguration.
16. If the partition that CTOOL is running on is affected by the reconfiguration then CTOOL tells the user to do a shutdown for reconfiguration of this partition.
17. Service processor waits for all affected cells to issue the "report at BIB command (cells ready for reconfiguration), then pushes out the new profile by delivering it to the CM, which stores it in PDH NVRAM.
18. Service processor releases the lock on the global portion of the complex profile, and reboots the listed partitions by commanding the cells' CMs to clear BIB. The reconfiguration can be aborted via a force unlock prior to the service processor starting to push out the new profile.

The system must be able to boot in the event of a service processor or USB failure. Thus, a copy of the complex profile is stored in the non-volatile RAM memory of every cell in the system. Since configuration changes are not supported without the service processor, a cell can assume its copy of the complex profile is valid in the event of a service processor or USB failure.

When a CM detects its cell power-up, it starts a timer and waits for the service processor to ask for the cell's complex profile checksum. If the timer expires before the service processor interrogates the CM, the CM assumes that the service processor is non-functional, and clears BIB. Thus the partition boots using the complex profile stored in PDH NVRAM.

During initial power up, the service processor waits for cells to check in, meaning that a cell that is checking in has properly powered up and has a coherent version of the complex profile in its shared memory. The service processor will wait for a predetermined time period for the first cell to check in, e.g. forever or a relatively long time period. After the first cell checks in, the service processor will wait for a second predetermined time period, which is shorter than the first time period, for additional cells to check in. After expiration of the second time period or all of the cells have reported in, the service processor will form the partitions of the system based on reporting cells, and will release those cells to boot by commanding the CMs on each cell to clear BIB. Any cells reporting in after the second time period will be treated as newly added cells to the complex.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system having a plurality of partitions, comprising:
   a plurality of cell boards, with each cell board including at least one main processor; and
   a service processor that is connected to each of the cell boards;
   data that describes a configuration for the computer system;
   wherein each partition includes at least one cell board, and the service processor manages configuration of the partitions; and
   wherein the service processor and each cell board stores a copy of the data, and the service processor may be replaced while the computer system is on-line.

2. The computer system of claim 1, wherein:
   each partition is running an operating system that is independent of the other partitions.

3. The computer system of claim 1, wherein:
   each cell board of a partition is capable of being reassigned to another partition while the computer system is on-line.

4. The computer system of claim 1, wherein:
   the service processor communicates with the cell boards via at least one USB format bus.

5. The computer system of claim 1, wherein:
   each cell board may be replaced while the computer system is on-line.

6. The computer system of claim 1, wherein:
   the service processor can command the operations of the cell boards.

7. The computer system of claim 1, wherein:
   the service processor can command the operations of the partitions.

8. The computer system of claims 7, wherein:
   the service processor can reset a partition.

9. The computer system of claim 1, wherein:
   the data is managed by the service processor.

10. The computer system of claim 9, wherein:
    information describing certain changes to the computer system are relayed to the service processor;
    the service processor modifies the data to correspond to the information; and
    the service processor distributes the modified data to the cell boards.

11. The computer system of claim 1, wherein each cell board includes:
    a micro-controller that handles communication between the service processor and the cell board.

12. The computer system of claim 1, wherein
    each partition configures itself based on the data.

13. A method for operating a computer system having a plurality of partitions and a plurality of cell boards, with each cell board including at least one main processor, wherein each partition includes at least one cell board, the method comprising:
    providing a service processor that is connected to each of the cell boards;
    providing data that describes a configuration for the computer system;
    storing a copy of the data in the service processor and in each cell board;
    managing configuration of the partitions via the service processor; and
    using at least one USB format bus to provide communications between the service processor and the cell boards.

14. The method of claim 13, further comprising:
    running an operating system on each partition that is independent of the other partitions.

15. The method of claim 13, further comprising:
    reassigning a cell board of a partition to another partition while the computer system is on-line.

16. The method of claim 13, further comprising:
    replacing at least one cell board while the computer system is on-line.

17. The method of claim 13, further comprising:
    commanding the operations of the cell boards via the service processor.

18. The method of claim 13, further comprising:
    commanding the operations of the partitions via the service processor.

19. The method of claim 18, further comprising:
    resetting the partition via the service processor.

20. The method of claim 13, further comprising:
    replacing the service processor while the computer system is on-line.

21. The method of claim 13, further comprising:
    managing the data via the service processor.

22. The method of claim 21, further comprising:
    relaying information describing certain changes to the computer system to the service processor;
    modifying the data to correspond to the information via the service processor; and
    distributing the data to the cell boards via the service processor.

23. The method of claim 1, further comprising:
    self-configuring by each partition based on the data.

24. A computer system having a plurality of partitions, comprising:

a plurality of cell boards, wherein each partition includes at least one cell board, and each cell board is capable of determining whether each of the other cell boards may be part of its partition independent of the other partitions; and a service processor that is connected to each of the cell boards, wherein the service processor manages configuration of the partitions, and the service processor and each cell board stores a copy of data that describes a configuration for the computer system;

wherein after reset, each cell enters a default configuration that excludes the other cells from being part of its partition, and the service processor changes the default configuration of each cell to another configuration.

* * * * *